United States Patent [19]
Luca

[11] Patent Number: 5,658,118
[45] Date of Patent: Aug. 19, 1997

[54] CYLINDER TRANSPORTER

[76] Inventor: Battista Luca, 505 Oley St., Reading, Pa. 19601

[21] Appl. No.: 607,792

[22] Filed: Feb. 27, 1996

[51] Int. Cl.$^6$ ........................................ B62B 1/06
[52] U.S. Cl. .................. 414/444; 414/457; 414/448; 414/910; 280/47.34; 280/47.2
[58] Field of Search ................ 414/490, 444, 414/448, 457, 446, 447, 449, 589, 590, 618, 619, 626, 910; 254/108, 2 R; 280/47.34, 47.2, 47.17, 47.24

[56] References Cited

U.S. PATENT DOCUMENTS

| | | | |
|---|---|---|---|
| 1,517,901 | 12/1924 | Gill | 414/457 |
| 1,820,263 | 8/1931 | Williams | 414/457 X |
| 2,415,655 | 2/1947 | Reinert . | |
| 2,500,055 | 3/1950 | Baker . | |
| 2,738,086 | 3/1956 | Reich . | |
| 2,903,147 | 9/1959 | Davis, Jr. . | |
| 2,959,309 | 11/1960 | Hopfeld | 414/447 |
| 3,737,147 | 6/1973 | Morgan et al. | 254/108 |
| 3,913,762 | 10/1975 | Alexander . | |
| 4,181,463 | 1/1980 | Mooney | 414/490 |
| 4,205,937 | 6/1980 | Fawley | 414/457 |
| 4,281,957 | 8/1981 | Vishe et al. | 414/457 |
| 4,492,505 | 1/1985 | Dunning | 414/454 |
| 5,122,027 | 6/1992 | Tabayashi | 414/622 |
| 5,145,311 | 9/1992 | Salvucci | 414/592 |

FOREIGN PATENT DOCUMENTS

| | | | |
|---|---|---|---|
| 1365474 | 5/1964 | France | 414/444 |
| 342476 | 12/1959 | Switzerland | 414/444 |

*Primary Examiner*—Frank E. Werner
*Attorney, Agent, or Firm*—Synnestvedt & Lechner

[57] ABSTRACT

A transporter for elongated compressed gas cylinders comprising an elongated load bearing beam supported in an upright inclining position by a pair of rotatably attached wheels and a supplemental support, the support also mounting a wheel which pivots about a vertical axis to facilitate a steering function. The transporter further having hook device for engaging a hook receiving aperture on a compressed gas cylinder, the hook device movably attached to the beam via a device for elevating and lowering the hook relative to the beam. Handle devices attached to the transporter provide for manual actuation of the elevating and lowering device as well as for tilting motion and movement of the transporter. The beam having a cylinder support yoke fixedly attached for cradling a compressed gas cylinder carried by the transporter, the yoke having a strap connectably mounted which encircles and secures a compressed gas cylinder. The beam further having an end wheel which cooperates with the wheel pair to stably support the transporter in a substantially vertical position and provide mobility thereto.

17 Claims, 4 Drawing Sheets

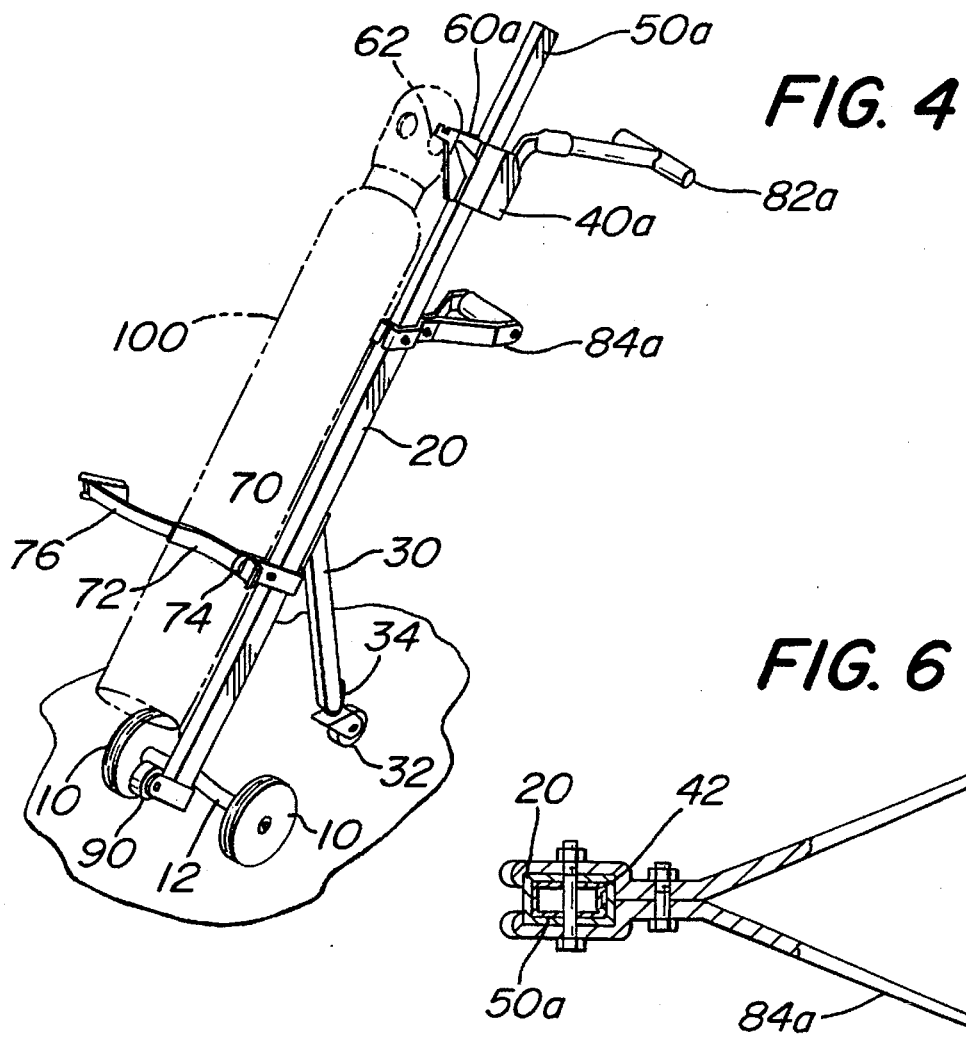
FIG. 4
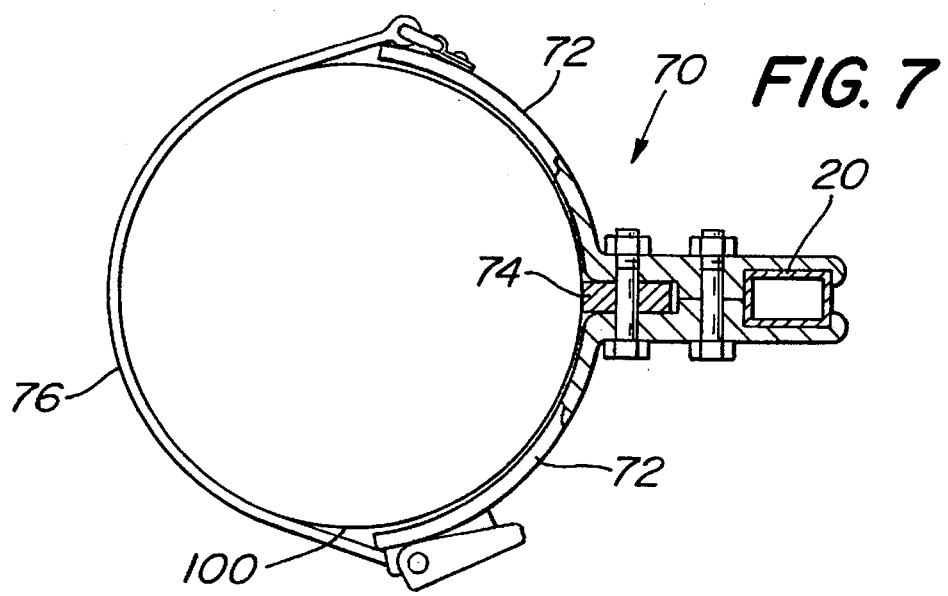
FIG. 6
FIG. 7 ns5,658,118

CYLINDER TRANSPORTER

FIELD OF THE INVENTION

This invention relates to manually operated transporters for the transportation of heavy objects and especially to transporters specifically designed for the handling and moving of elongated compressed gas cylinders.

BACKGROUND OF THE INVENTION

Elongated compressed gas cylinders are ubiquitous throughout a wide spectrum of manufacturing and service industries. The cylinders are found wherever a source of compressed gas is needed, most typically in welding facilities. The need has long existed for improved handling and transportation equipment to facilitate use with various different pieces of equipment and for removal of the cylinders for recharging when emptied.

Handling and moving gas filled cylinders is particularly onerous due to the heavy weight of a cylinder and danger posed by the relatively high pressure of the contents. Such gas cylinders are unwieldy as well and typically are not particularly stable without a separate supporting structure of some type. These characteristics are inherent in their design, which requires hemispherical ends to efficiently withstand the relatively high pressures of the compressed gas contents.

The significant weight and unwieldy nature of compressed gas cylinders prohibits workers with physical limitations, such as back problems or even more serious disabilities, from effectively and comfortably performing tasks requiring transporting or positioning of such cylinders. Additionally, repeated handling of heavy, awkward cylinders can lead to back and knee problems or other job related injuries, such as hernias, crushed fingers and the like.

Without more convenient means for safely handling and transporting compressed gas cylinders, the potential for serious accidents makes the use of compressed gas cylinders a hazardous proposition. Were a filled cylinder to fall over and fracture its valve for example, the cylinder would become a lethal rocket projectile. Dangerous, highly flammable gases, such as acetylene or MAPP gas, could also be rapidly vented in great volume and ignited by an ignition source, producing an explosion.

Although the problems associated with the handling and transport of compressed gas cylinders are recognized, no currently available transporter adequately addresses all of the concerns. For example, U.S. Pat. No. 4,205,937 to Fawley is essentially a modified hand truck which may provide relatively safe transport of a compressed gas cylinder, but its limitations are obvious. Only two sizes of cylinder are provided for, and no variable adjustment means is present which will allow a cylinder to be conveniently positioned to a predetermined vertical height, thus affording easy exchange of gas cylinders between various different pieces of equipment used in conjunction with such cylinders.

SUMMARY AND OBJECTS OF THE INVENTION

This invention provides a transporter for handling and moving compressed gas cylinders comprising a single load bearing beam supported in an upright inclining position by a pair of ground engaging wheels and a supplemental support. The wheels are rotatably mounted at one end and on opposite sides of the beam. The supplemental support is fixedly attached to the beam and extends downwardly to support the beam and provide freedom of movement between the upright inclining position and a substantially vertical position. Preferably, the supplemental support has a rotatably mounted wheel which cooperates with the wheel pair to provide mobility to the transporter. More preferably, the supplemental support mounted wheel has a pivot means allowing the wheel to pivot about a substantially vertical axis to facilitate a steering function.

A hook for engaging compressed gas cylinders or the like is located at the opposite end of the beam from the wheels. The hook is attached to the beam by a means for elevating and lowering the hook which allows the vertical position of the hook relative to the beam to be set to a variable, predetermined height.

In one preferred embodiment of the invention, the elevating means comprises a jacking mechanism which engages a jack shaft. Preferably, the jack shaft is arranged lengthwise of the beam, and the hook is fixedly attached to the jack shaft. The jacking mechanism is preferably fixedly attached to the beam. The jack shaft and the hook are elevated and lowered relative to the beam when the jacking mechanism is actuated. Preferably, the beam is tubular and the jack shaft is arranged coaxially within the beam and telescopes in and out when the jack shaft is elevated and lowered by the jacking mechanism. More preferably, the embodiment has one or more handles, the handles being attached to the hook and to the jacking mechanism respectively. The handles allow for tilting movement of the transporter from an inclining upright position to a substantially vertical position for movement of the transporter on its wheels and for manual actuation of the jacking mechanism.

In another preferred embodiment of a transporter according to the invention, the hook is fixedly attached to the jacking mechanism. Preferably, the jack shaft is attached to and projects upwardly from the beam. More preferably, the jack shaft is integral with the beam. The jacking mechanism preferably engages the jack shaft and is elevated and lowered relative to the beam along with the fixedly attached hook when the jacking mechanism is actuated. Even more preferably, an additional handle is fixedly attached to the transporter. The additional handle provides for tilting movement of the transporter from an upright inclining position to a substantially vertical position for movement of the transporter on its wheels and for actuation of the jacking mechanism.

In the preferred embodiments, the hook is capable of interengaging a hook receiving aperture in a vertically standing compressed gas cylinder. Also, a cylinder support yoke is fixedly attached to the beam. The support yoke preferably comprises a pair of outwardly open arms oriented to cradle a compressed gas cylinder or the like, preferably when the cylinder is engaged by the hook means. In a preferred embodiment, the support yoke houses a cylinder support roller which supports a cylinder cradled within the arms of the yoke. The roller provides for relatively friction free lateral motion of the cylinder relative to the yoke when the cylinder is elevated and shifted into a parallel position with the beam. Preferably, a strap is connectably mounted to the arms of the yoke, the strap encircling and securing a cylinder cradled by the support yoke.

In the preferred embodiments, a wheel is rotatably mounted to one end of the beam. Preferably, the wheel cooperates with the ground engaging wheel pair to support the transporter stably in a substantially vertical position and also provide mobility to the transporter.

It is an object of this invention to provide for the safe and convenient transport and handling of compressed gas cylinders.

It is a further object of the invention to provide a means for variably adjusting the vertical position of a cylinder to a predetermined height above the ground to facilitate the transport of compressed gas cylinders among the various pieces of equipment which use or service such cylinders.

It is still another object of the invention to provide an inexpensive, simple, efficient, lightweight and novel structure for the transport and handling of compressed gas cylinders.

These and other objects will become apparent from a consideration of the following drawings and detailed description of preferred embodiments of the invention.

BRIEF DESCRIPTION OF THE DRAWINGS

FIG. 4 shows an isometric view of a second preferred embodiment of the transporter in an upright inclining position;

FIG. 6 is a sectional view taken along line 6—6 of FIG. 5; and

FIG. 7 is a sectional view taken along line 7—7 of FIG. 5.

DETAILED DESCRIPTION OF PREFERRED EMBODIMENTS

Figure 1:
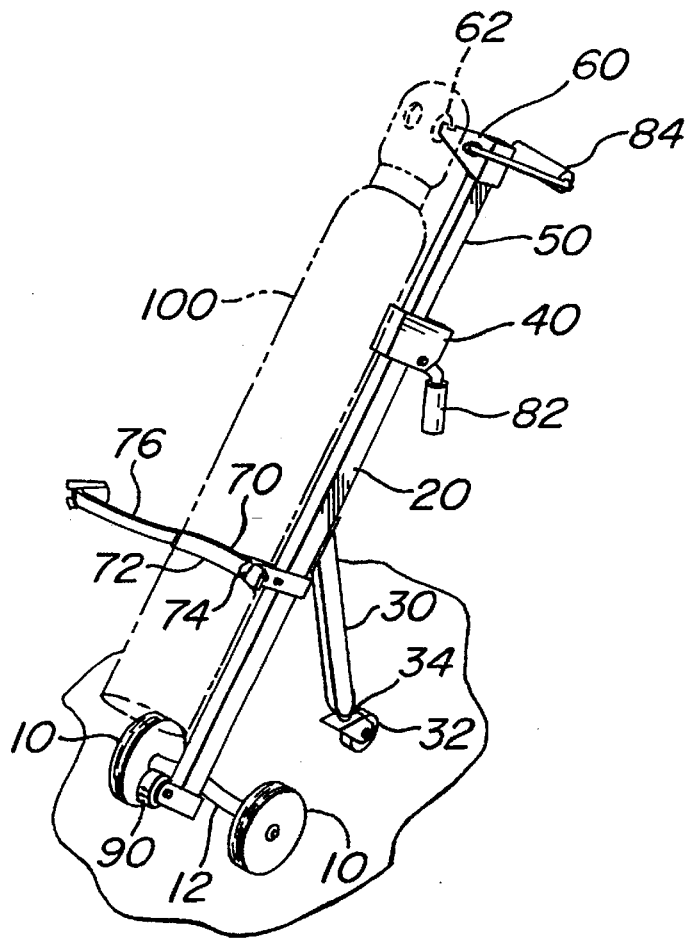
FIG. 1 shows an isometric view of one preferred embodiment of the transporter in an upright reclining position.
Figure 3:
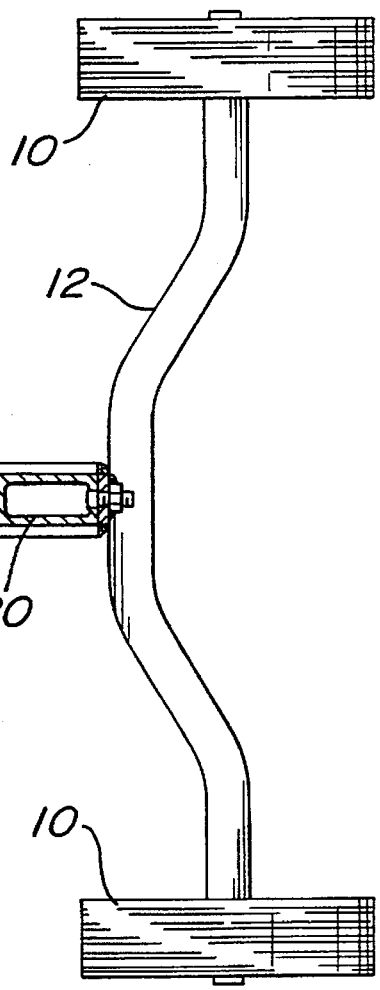
FIG. 3 is a sectional view taken along line 3—3 of FIG. 2.
Figure 2:
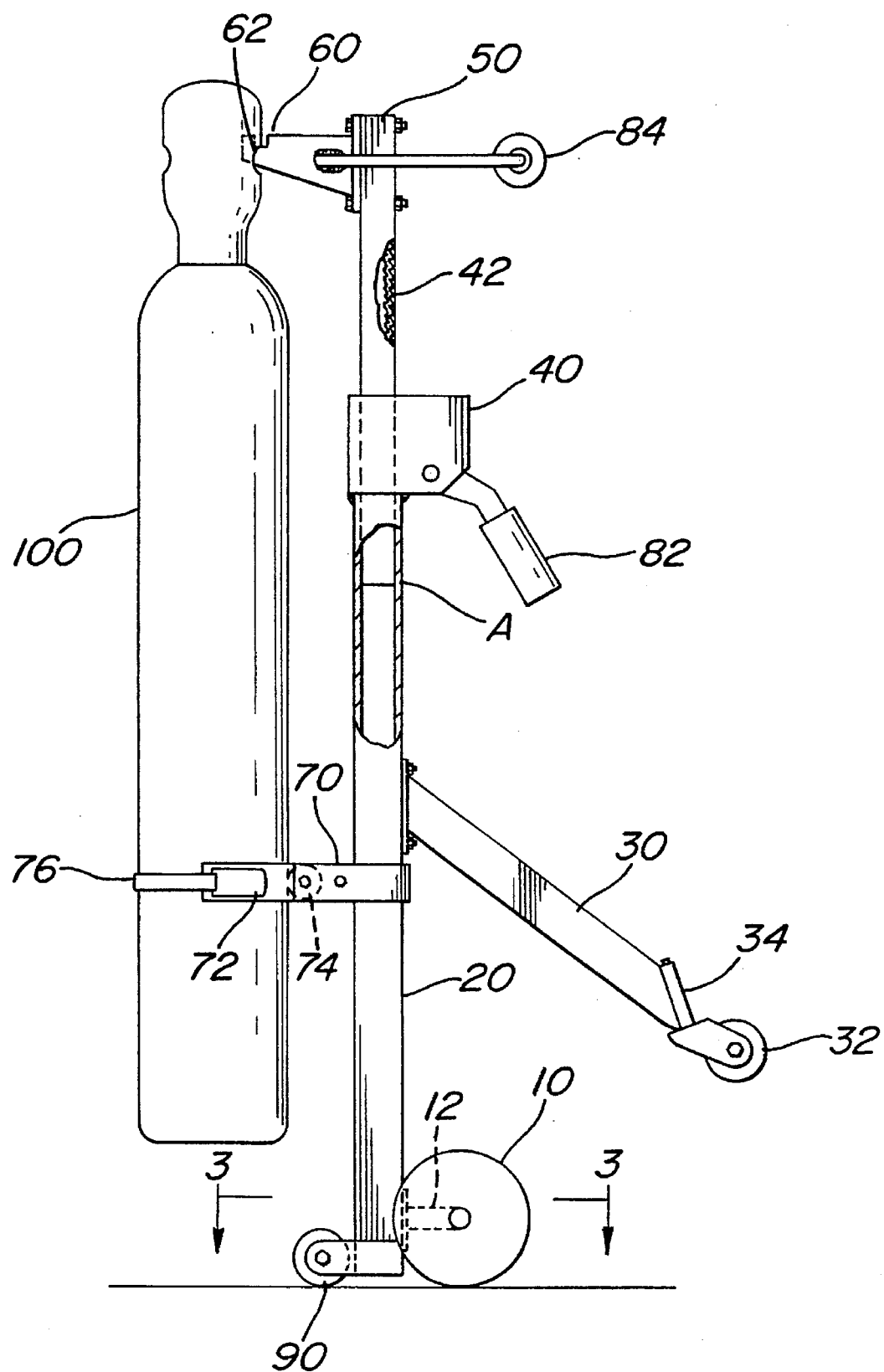
FIG. 2 shows a side view of one preferred embodiment of the transporter in a substantially vertical position.

FIGS. 1 and 2 show one preferred embodiment of a transporter for compressed gas cylinders according to the invention. Ground engaging wheel pair 10 is rotatably attached to one end of an elongated load bearing beam 20 by axle assembly 12. FIG. 3 shows a detail of axle assembly 12 and wheel pair 10 attached to beam 20. Beam 20 is further supported in an upright inclining position in FIG. 1 by supplemental support 30. Support 30 preferably has ground engaging wheel 32 mounted rotatably at one end. Wheel 32 further has pivot means 34 which allows wheel 32 to pivot about a substantially vertical axis, thus facilitating a steering function. Together, wheel pair 10 and wheel 32 stably support the transporter in an upright inclining position as shown in FIG. 1 and provide mobility to the transporter.

At the opposite end of the beam from wheel pair 10, a jacking mechanism 40 is fixedly attached, as shown in FIGS. 1 and 2. The jacking mechanism is preferably of the type shown in U.S. Pat. No. 3,737,147 to Morgan et al, although the mechanism need not be limited to this particular design or principle of operation. Jacking mechanism 40 includes a ratchet not shown which interengages with teeth 42 on jack shaft 50, shown in FIG. 2. Teeth 42 are shown formed by indentations into jack shaft 50, depicted in FIG. 6. Jack shaft 50 is arranged lengthwise of beam 20 as seen in FIGS. 1 and 2.

Preferably, beam 20 is tubular. Jack shaft 50 is arranged coaxially and in telescopic relationship with beam 20, as shown by the cut-away in FIG. 2 at region A. Hook 60 is fixedly attached to one end of jack shaft 50. Hook 60 engages a hook receiving aperture 62 in compressed gas cylinder 100. When jacking mechanism 40 is actuated, jack shaft 50 is elevated or lowered relative to beam 20, thereby elevating or lowering hook means 60 and interengaged compressed gas cylinder 100.

Compressed gas cylinder 100 is cradled by cylinder support yoke 70. Yoke 70, shown in detail in FIG. 7, comprises preferably two outwardly open arms 72 and is fixedly attached to beam 20 such that yoke 70 supports and cradles cylinder 100 when engaged by hook means 60. In a preferred embodiment, yoke 70 houses roller 74 which is rotatably mounted with respect to yoke 70, as is shown in FIG. 7. Roller 74 supports cylinder 100 when the cylinder is cradled in yoke 70, as shown in FIGS. 2 and 7, and roller 74 provides relatively friction free motion of cylinder 100 when the cylinder is elevated or lowered by jacking means 40.

Preferably, yoke 70 is provided with a retainer strap 76. Strap 76 is connectably attached to the ends of arms 72 and encircles cylinder 100, thereby securing the cylinder during operation of the transporter.

The embodiment of FIGS. 1 and 2 preferably uses two handles, 82 and 84. Handle 82, preferably attached to jacking mechanism 40, serves as a manually activated means for elevating and lowering jack shaft 50, as well as means for moving the transporter on its ground engaging wheels and for effecting tilting motion of the transporter from an upright inclining position shown in FIG. 1 to a substantially vertical position shown in FIG. 2, and vice versa. Similarly, handle 84, preferably fixedly attached to hook 60, serves as manual means for moving the transporter on its ground engaging wheels and effecting tilting motion of the transporter from an upright inclining position to a substantially vertical position, and vice versa.

Finally, FIGS. 1–3 also show end wheel 90 rotatably attached to one end of beam 20 adjacent to wheel pair 10. End wheel 90 is a ground engaging wheel and cooperates with wheel pair 10 to stably support the transporter in a substantially vertical position, as shown in FIG. 2. End wheel 90 and wheel pair 10 provide mobility to the transporter.

Figure 5:
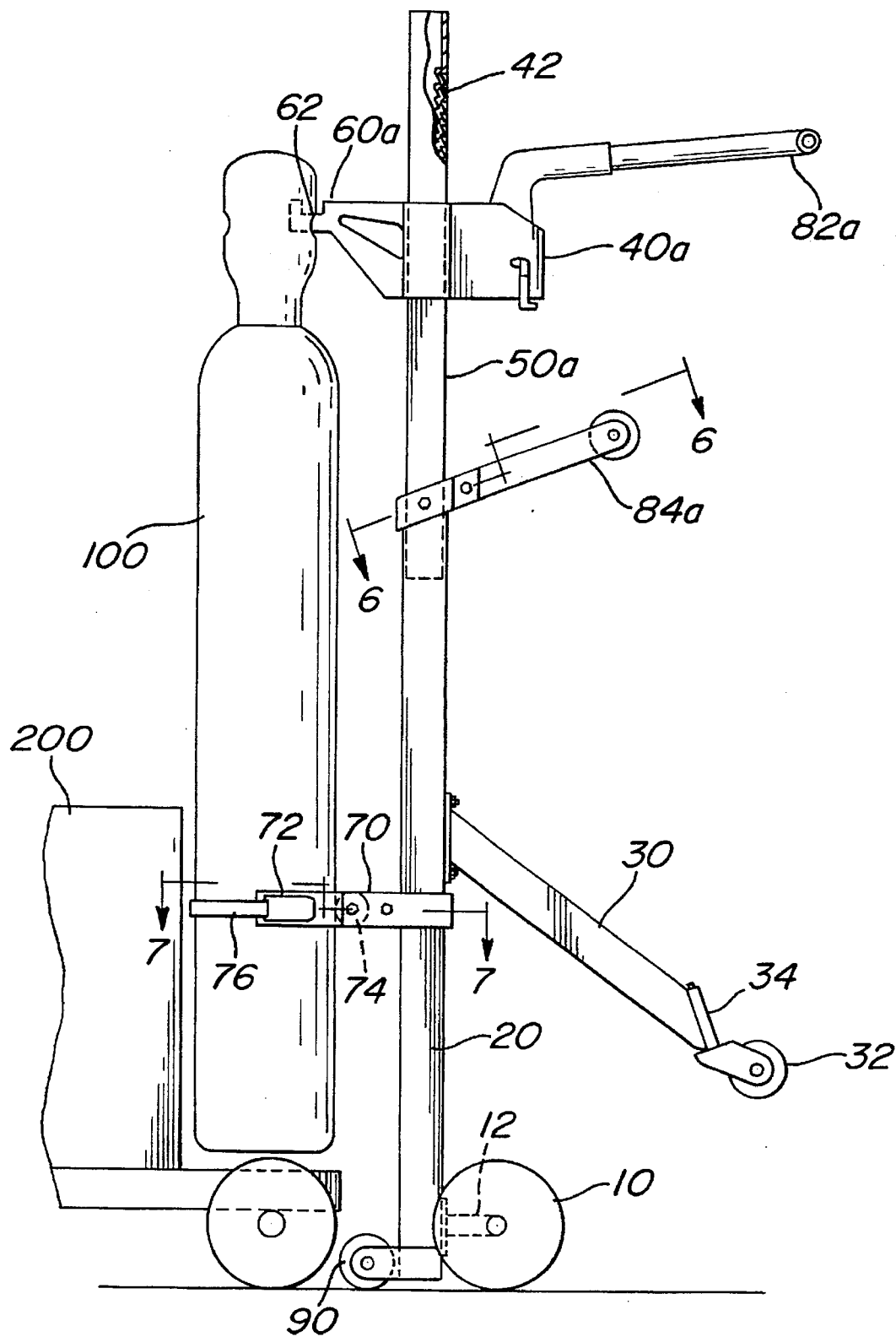
FIG. 5 shows a side view of a second preferred embodiment of the transporter in a substantially vertical position.

FIGS. 4 and 5 show another preferred embodiment of a transporter for compressed gas cylinders according to the invention. In this embodiment, jack shaft 50a is arranged lengthwise of beam 20 and fixedly attached to beam 20 opposite from wheel pair 10. Preferably, jack shaft 50a is integral with beam 20. Jacking mechanism 40a movably interengages jack shaft 50a. The jacking mechanism is preferably of the type shown in U.S. Pat. No. 3,737,147 to Morgan et al. Hook 60a is fixedly attached to jacking mechanism 40a and engages a hook receiving aperture 62 in the cap at the top of compressed gas bottle 100. When jacking mechanism 40a is actuated, the jacking mechanism and the attached hook 60a engaged with compressed gas cylinder 100 are elevated or lowered relative to beam 20. Preferably, jacking mechanism 40a is manually actuated by handle 82a, which also provides means for manually moving the transporter and tilting the transporter from an upright inclining position to a substantially vertical position. Similarly, handle 84a, shown in detail in FIG. 6, also provides means for manually moving the transporter and tilting the transporter from an upright inclining position to a substantially vertical position. Handle 84a is preferably fixedly attached to beam 20.

In describing the operation of the invention, reference is made primarily to the preferred embodiment shown in FIGS. 4 and 5 for illustrative purposes.

In operation, the transporter as shown in FIG. 4 is wheeled up to a vertically standing compressed gas cylinder 100. Cylinder 100 could be supported by a storage rack or on a piece of apparatus, such as the mig welder assembly 200 schematically shown in FIG. 5. Handles 82a and/or 84a are then used to tilt the transporter from an upright inclining position shown in FIG. 4 to a substantially vertical position wherein the transporter is stably and mobily supported by ground engaging wheel pair 10 and end wheel 90, as shown in FIG. 5. The transporter is then wheeled in close proximity to cylinder 100 and hook 60a adjusted in its vertical position on jack shaft 50a via jacking mechanism 40a, actuated by handle 82a, such that the hook engages the hook engaging aperture 62 of cylinder 100 as shown in FIG. 5. Jacking mechanism 40a is then used to elevate cylinder 100 away from its supporting structure 200, the cylinder weight being borne by the transporter structure. Strap 76 is now connected across arms 72 to encircle and secure cylinder 100 within support yoke 70. Handles 82a and/or 84a are used to move the transporter away from its support 200 via end wheel 90 and wheel pair 10. The handles are next used to tilt the transporter from its vertical position to an upright inclining position as shown in FIG. 4. Cylinder 100 will then be cradled by the outwardly oriented arms 72 of support yoke 70. Roller 74 housed in yoke 70 now supports cylinder 100 and provides relatively friction free motion of the cylinder lengthwise along the transporter. Wheel pair 10 and supplemental support wheel 32 stably support the transporter with its load and allow the cylinder to be moved safely and conveniently, steering of the transporter facilitated by the pivot means 34 allowing wheel 32 to rotate about a vertical axis.

The preferred embodiment illustrated in FIGS. 1 and 2 operates in substantially the same way as described above, with the exceptions that handles 82 and/or 84 are used to tilt the transporter into a substantially vertical position, hook 60 engages the hook engaging aperture 62 of cylinder 100, jacking mechanism 40 actuated by handle 82 is used to adjust the vertical position of hook 60 and to elevate cylinder 100 away from its supporting structure 200, and handles 82 and 84 are used to move the laden transporter away from structure 200 and tilt the transporter to an upright inclining position.

As the transporter must bear relatively heavy loads safely, it is preferable to construct the transporter out of strong and durable materials such as steel or high strength aluminum alloys and their equivalents. It is also preferable that different materials be combined in one transporter design to provide for design efficiency and appropriate use of the material best suited for a particular purpose. Preferably, certain parts may also be made from plastic or rubber material, as required for the part's particular function.

The transporter according to the invention provides significant novel technological advances over previous attempts to grapple with the problems posed by the safe and convenient transport and handling of compressed gas cylinders. While the above description contains some specificities, these should not be construed as limitations on the scope of the invention. Accordingly, the scope of the invention should be determined only by the following claims and their equivalents when read in light of the foregoing description.

I claim:

1. A transporter for an elongated compressed gas cylinder and the like, said cylinder having a hook receiving aperture at its upper end, said transporter comprising:

a single elongated load bearing beam;

a pair of ground engaging support wheels rotatably mounted at one end of said beam on opposite sides thereof;

a supplemental support attached to said load bearing beam and extending downwardly therefrom for support of said beam in an upright inclining position, said supplemental support providing freedom of movement of the load bearing beam between said upright inclining position and a substantially vertical position;

handle means for tilting movement of said beam between said upright inclining position and said substantially vertical position and for moving said transporter from one location to another;

a cylinder support yoke fixedly attached to said load bearing beam on the side opposite to said supplemental support, said yoke having a pair of outwardly open arms oriented to cradle a cylinder extending lengthwise of said beam;

cylinder lift means including hook means moveable axially of said beam, said hook means being interengagable with the hook receiving aperture in a vertically standing cylinder when the beam is in said substantially vertical position, said cylinder lift means further comprising a jack housing containing a jacking mechanism, said jack housing being fixedly attached to said load bearing beam at the end opposite from said support wheels, an elongated jack shaft arranged lengthwise of said load bearing beam, said hook means being fixedly attached to said jack shaft, said jacking mechanism being interengagable with said jack shaft to elevate and lower said jack shaft and said hook means; and said handle means comprising first and second handles, said first handle extending opposite from said hook means on said jack shaft, said first handle being fixedly attached to said hook means, said first handle effecting movement of said load bearing beam between said upright inclining position and said substantially vertical position and moving said transporter, said second handle being attached to said jack housing, said second handle being a manually activated means for elevating and lowering said hook means, said cylinder lift means being effective when said hook means is interengaged with the hook receiving aperture for moving said cylinder into said outwardly open arms.

2. A transporter according to claim 1 in which said supplemental support has a rotatably mounted wheel cooperating with said support wheels to stably support said transporter in an upright inclining position and provide mobility thereto.

3. A transporter according to claim 2 in which said supplemental support mounted wheel has a pivoting means allowing said wheel to pivot about a substantially vertical axis to facilitate a steering function.

4. A transporter according to claim 1 in which said load bearing is tubular and said jack shaft is mounted coaxially with respect thereto.

5. A transporter according to claim 1 in which said hook means is positioned in a plane bisecting said cylinder support yoke arms to raise said cylinder into a position embraced by said yoke arms upon actuation of said jacking mechanism.

6. A transporter according to claim 1 in which said cylinder support yoke houses a yoke roller supporting said compressed gas cylinder when said cylinder is cradled by the arms of said cylinder support yoke, said yoke roller rotatably mounted affording relatively friction free motion of said cylinder lengthwise along said beam.

7. A transporter according to claim 1 having a strap connectable to the arms of said cylinder support yoke for encircling and securing said compressed gas cylinder cradled by said support yoke during use of said transporter.

8. A transporter according to claim 1 having an end wheel rotatably mounted on one end of said beam adjacent said support wheels, said end wheel being positioned to cooperate with said support wheels to stably support said transporter in a substantially vertical position and provide mobility thereto.

9. A transporter for an elongated compressed gas cylinder and the like, said cylinder having a hook receiving aperture at its upper end, said transporter comprising:

a single elongated load bearing beam;

a pair of ground engaging support wheels rotatably mounted at one end of said beam on opposite sides thereof;

a supplemental support attached to said load bearing beam and extending downwardly therefrom for support of said beam in an upright inclining position, said supplemental support providing freedom of movement of the load bearing beam between said upright inclining position and a substantially vertical position;

handle means for tilting movement of said beam between said upright inclining position and said substantially vertical position and for moving said transporter from one location to another;

a cylinder support yoke fixedly attached to said load bearing beam on the side opposite to said supplemental support, said yoke having a pair of outwardly open arms oriented to cradle a cylinder extending lengthwise of said beam;

cylinder lift means including hook means moveable axially of said beam, said hook means being interengagable with the hook receiving aperture in a vertically standing cylinder when the beam is in said substantially vertical position, said cylinder lift means further comprising an elongated jack shaft extending lengthwise of said load bearing beam, said jack shaft being fixedly attached to said load bearing beam at the end opposite from said support wheels, a jacking mechanism mounting said hook means, said jacking mechanism being interengagable with said jack shaft to elevate and lower said hook means;

a jack housing for said jacking mechanism, said handle means comprising a handle fixed to said jack housing and extending opposite from said hook means, said handle effecting movement of said load bearing beam between an upwardly inclining position and a substantially vertical position and for moving said transporter, said handle further comprising a manually operable means for elevating and lowering said hook means; and said cylinder lift means being effective when said hook means is interengaged with the hook receiving aperture for moving said cylinder into said outwardly open arms.

10. A transporter according to claim 9, further including a second handle means comprising a handle fixedly attached to said beam, said second handle being conveniently positioned and oriented to effect tilting motion of said transporter from said upright inclining position to said substantially vertical position and vice versa and for moving said transporter.

11. A transporter according to claim 9 in which said supplemental support has a rotatably mounted wheel cooperating with said support wheels to stably support said transporter in an upright inclining position and to provide mobility thereto.

12. A transporter according to claim 11 in which said supplemental support mounted wheel has a pivoting means allowing said wheel to pivot about a vertical axis to facilitate a steering function.

13. A transporter according to claim 9 in which said cylinder lift means comprises a jack shaft integrally formed with said load bearing beam.

14. A transporter according to claim 9 in which said hook means is positioned in a plane bisecting said cylinder support yoke arms to raise said cylinder into a position embraced by said yoke arms upon actuation of said jacking mechanism.

15. A transporter according to claim 9 in which said cylinder support yoke houses a yoke roller supporting said compressed gas cylinder when said cylinder is cradled by the arms of said cylinder support yoke, said yoke roller rotatably mounted affording relatively friction free motion of said cylinder lengthwise along said beam.

16. A transporter according to claim 9 having a strap connectable to the arms of said cylinder support yoke for encircling and securing said compressed gas cylinder cradled by said support yoke during use of said transporter.

17. A transporter according to claim 9 having an end wheel rotatably mounted on one end of said beam adjacent said support wheels, said end wheel being positioned to cooperate with said support wheels to stably support said transporter in a substantially vertical position and provide mobility thereto.

* * * * *